(12) United States Patent
Marin

(10) Patent No.: US 9,886,682 B2
(45) Date of Patent: Feb. 6, 2018

(54) GENERATION OF A THREE-DIMENSIONAL VIRTUAL REALITY ENVIRONMENT FROM A BUSINESS PROCESS MODEL

(75) Inventor: Mike A. Marin, Laguna Hills, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 759 days.

(21) Appl. No.: 13/350,992

(22) Filed: Jan. 16, 2012

(65) Prior Publication Data
US 2012/0116953 A1 May 10, 2012

Related U.S. Application Data

(63) Continuation of application No. 11/943,734, filed on Nov. 21, 2007, now abandoned.

(51) Int. Cl.
*G06Q 10/00* (2012.01)
*G06Q 10/10* (2012.01)
(Continued)

(52) U.S. Cl.
CPC ......... *G06Q 10/10* (2013.01); *G06Q 10/0633* (2013.01); *G06Q 30/018* (2013.01); *G06Q 40/025* (2013.01)

(58) Field of Classification Search
CPC ......... G06T 17/10; G06T 19/20; G06T 15/08; G06Q 10/067; G06Q 10/0633; G06Q 10/06375
(Continued)

(56) References Cited

U.S. PATENT DOCUMENTS 5,608,850 A 3/1997 Robertson
5,826,266 A 10/1998 Honda
(Continued)

FOREIGN PATENT DOCUMENTS

JP 2003167931 6/2003

OTHER PUBLICATIONS

Schonhage et al., 3D Gadgets for Business Process Visualization—a case study—, VRML 2000, Monterrey, CA USA, pp. 131-138.*
(Continued)

*Primary Examiner* — Beth V Boswell
*Assistant Examiner* — Darlene Garcia-Guerra
(74) *Attorney, Agent, or Firm* — Farrokh Pourmirzaie; SVL IPLaw Edell, Shapiro & Finnan, LLC

(57) ABSTRACT

A method and computer program product for generating a three-dimensional virtual reality environment from a business process model in a computer system are provided. The method includes analyzing a business process model to identify a plurality of activities and at least one transition criterion between the plurality of activities, where the business process model is unbounded to a physical implementation. The method also includes transforming the business process model into a three-dimensional virtual reality environment with virtual physical constraints, including a plurality of virtual rooms representing the plurality of activities and one or more virtual access points to the virtual rooms representing the at least one transition criterion. The method further includes outputting the three-dimensional virtual reality environment.

21 Claims, 3 Drawing Sheets

(51) Int. Cl.
*G06Q 10/06* (2012.01)
*G06Q 30/00* (2012.01)
*G06Q 40/02* (2012.01)

(58) Field of Classification Search
USPC ....... 345/633, 418, 419; 705/348, 7.27, 7.37
See application file for complete search history.

(56) References Cited

U.S. PATENT DOCUMENTS

| | | | |
|---|---|---|---|
| 5,900,879 | A | 5/1999 | Berry et al. |
| 6,023,270 | A | 2/2000 | Brush et al. |
| 6,119,229 | A * | 9/2000 | Martinez et al. ............... 726/28 |
| 6,154,723 | A | 11/2000 | Cox et al. |
| 6,226,001 | B1 | 5/2001 | Bardon et al. |
| 6,289,299 | B1 * | 9/2001 | Daniel et al. .................. 703/21 |
| 6,289,380 | B1 * | 9/2001 | Battat et al. .................. 709/224 |
| 6,466,239 | B2 | 10/2002 | Ishikawa |
| 6,976,846 | B2 | 12/2005 | Dupont et al. |
| 7,149,668 | B2 | 12/2006 | Schwanecke et al. |
| 7,570,261 | B1 * | 8/2009 | Edecker ............... G06Q 20/102 345/420 |
| 2001/0019337 | A1 | 9/2001 | Kim |
| 2002/0030679 | A1 * | 3/2002 | McDowall et al. .......... 345/421 |
| 2002/0085041 | A1 | 7/2002 | Ishikawa |
| 2003/0207237 | A1 | 11/2003 | Glezerman |
| 2003/0215779 | A1 * | 11/2003 | Dupont et al. ................ 434/350 |
| 2004/0204970 | A1 | 10/2004 | Boden et al. |
| 2005/0021472 | A1 | 1/2005 | Gettman et al. |
| 2005/0088529 | A1 | 4/2005 | Geng |
| 2005/0240605 | A1 | 10/2005 | Knoblock et al. |
| 2005/0251409 | A1 * | 11/2005 | Johnson et al. .................. 705/1 |
| 2006/0105825 | A1 | 5/2006 | Findlay |
| 2006/0111931 | A1 * | 5/2006 | Johnson et al. .................. 705/1 |
| 2006/0178218 | A1 * | 8/2006 | Jung et al. ...................... 463/42 |
| 2006/0190926 | A1 * | 8/2006 | Bennett et al. ............... 717/114 |
| 2006/0281065 | A1 | 12/2006 | Margiotta |
| 2007/0150330 | A1 * | 6/2007 | McGoveran ...................... 705/8 |
| 2007/0179867 | A1 * | 8/2007 | Glazer et al. ................... 705/27 |
| 2007/0238079 | A1 * | 10/2007 | Harrison ...................... 434/236 |
| 2007/0288412 | A1 * | 12/2007 | Linehan .......................... 706/45 |
| 2008/0120153 | A1 * | 5/2008 | Nonemacher et al. ........... 705/7 |
| 2008/0126053 | A1 * | 5/2008 | Cutts et al. .................... 703/13 |
| 2008/0183515 | A1 * | 7/2008 | Chheda et al. ................... 705/7 |
| 2008/0281912 | A1 | 11/2008 | Dillenberger et al. |
| 2009/0083052 | A1 * | 3/2009 | Bokor et al. ..................... 705/1 |
| 2009/0251457 | A1 * | 10/2009 | Walker ................... G06T 17/10 345/418 |
| 2010/0185529 | A1 * | 7/2010 | Chesnut ................. G06Q 30/00 705/26.1 |

OTHER PUBLICATIONS

Jason A. Pamplin & Ying Zhu, "Design and Implementation of a Workflow Rendering Engine", Proceedings of MSV/AMCS 2004, pp. 246-251.

Steve Benford et al., "Exploiting Virtual Reality as a Conceptual Model for CSCW," IEE Colloquium on Using Virtual Worlds, Apr. 15, 1992, 5 pages.

Toan Nguyen, et al., "Collaborative Multidisciplinary Design in Virtual Environments," 10th International Conference on Computer Supported Cooperative Work in Design, May 2006, 6 pages.

Bastiaan Schonhage, et al., "3D Gadgets for Business Process Visualization—a case study," Feb. 2000, Proceedings of the fifth symposium on Virtual reality modeling language (Web3D-VRML) VRML '00, Publisher: ACM Press, 8 pages.

Henry M. Franken, "A Virtual Test Environment for Business Processes," Apr. 1997, ACM SIGGROUP Bulletin, vol. 18, Issue 1, Publisher: ACM Press, 5 pages.

Ismael H.F. Santos, et al., "A Multimedia Workflow-Based Collaborative Engineering Environment for Oil & Gas Industry," Jun. 2004, Proceedings of the 2004 ACM SIGGRAPH International Conference on Virtual Reality continuum and its applications in industry VRCAI '04, Publisher: ACM Press, 8 pages.

Gernot Goebbels, et al., "Design and Evaluation of Team Work in Distributed Collaborative Virtual Environments," Proceedings of the ACM symposium on Virtual reality software and technology, Oct. 1-3, 2003, Osaka, Japan, 8 pages.

Karen C. Jones, et al., "Virtual Reality for manufacturing Simulation," Proceedings of the 25th conference on winter simulation WSC '93, Publisher: ACM Press, 6 pages.

Oliver Kreylos, et al., "Enabling Scientific Workflows in Virtual Reality," Jun. 2006, Proceedings on the 2006 ACM international conference on virtual reality continuum and its applications VRCIA '06, Publisher: ACM Press, 8 pages.

Ivo Vondrak, et al., "Business Processes," Dept of Computer Science, Faculty of Electrical Engineering and Computer Science, VSB—Technical University of Ostrava, GIS Ostrava 2006, 15 pages.

* cited by examiner

GENERATION OF A THREE-DIMENSIONAL VIRTUAL REALITY ENVIRONMENT FROM A BUSINESS PROCESS MODEL

CROSS-REFERENCE TO RELATED APPLICATIONS

This application is a continuation of U.S. patent application Ser. No. 11/943,734, entitled "Generation of a Three-Dimensional Virtual Reality Environment From a Business Process Model" and filed Nov. 21, 2007, the disclosure of which is incorporated herein by reference in its entirety.

BACKGROUND OF THE INVENTION

Field of the Invention

This invention relates to computer-based generation of a three-dimensional virtual reality environment, and particularly to generating a three-dimensional virtual reality environment from a business process model.

Description of Background

Business processes can be modeled using several techniques, including formal techniques like Business Process Management Notation (BPMN) or activity diagrams in Unified Modeling Language (UML), and informal techniques using graphical drawing programs. Business processes are typically represented using nodes and arcs connecting the nodes. In most cases, nodes represent activities of the business process and arcs represent transitions used to describe the flow of the process by linking the activities in the order they should be executed. However, in some cases arcs are used to represent work that needs to be done, and nodes provide the order in which the work needs to be done to accomplish the business process. The business process model may require human participation for some of its activities to be completed, or may not require any human participation because the activities are fully automated by either computer applications or other types of machines. In most cases, a combination of automatic and human activities is used. Other business process modeling concepts like condition nodes and events can always be mapped to activities and arcs, so for the purpose of this application only activities and arcs will be used.

Virtual Reality (VR) describes a computer technology that allows humans to interact with a computer via a simulated environment. Most VR environments provide sensorial information such as sounds and visual experiences via computer interfaces (e.g., speakers, headphones, computer screen, stereoscopic technology, etc.), typically in three dimensions (3-D). VR environments are interactive through a variety of inputs, such as a keyboard, mouse, or glove.

Business processes are often difficult for humans to visualize, particularly when the business processes do not map directly to a physical implementation, such as a production line. Using a 3-D VR environment to visualize a business process that is unbounded to a physical implementation would be beneficial to simplify validation, simulation, execution, and monitoring of the business process. Accordingly, there is a need in the art for a method to generate a 3-D VR environment from a business process model.

SUMMARY OF THE INVENTION

The shortcomings of the prior art are overcome and additional advantages are provided through the provision of a method for generating a three-dimensional virtual reality environment from a business process model in a computer system. The method includes analyzing a business process model to identify a plurality of activities and at least one transition criterion between the plurality of activities, where the business process model is unbounded to a physical implementation. The method also includes transforming the business process model into a three-dimensional virtual reality environment with virtual physical constraints, including a plurality of virtual rooms representing the plurality of activities and one or more virtual access points to the virtual rooms representing the at least one transition criterion. The method further includes outputting the three-dimensional virtual reality environment.

A computer program product corresponding to the above-summarized method is also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECT

As a result of the summarized invention, technically we have achieved a solution which generates a three-dimensional virtual reality environment from a business process model.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
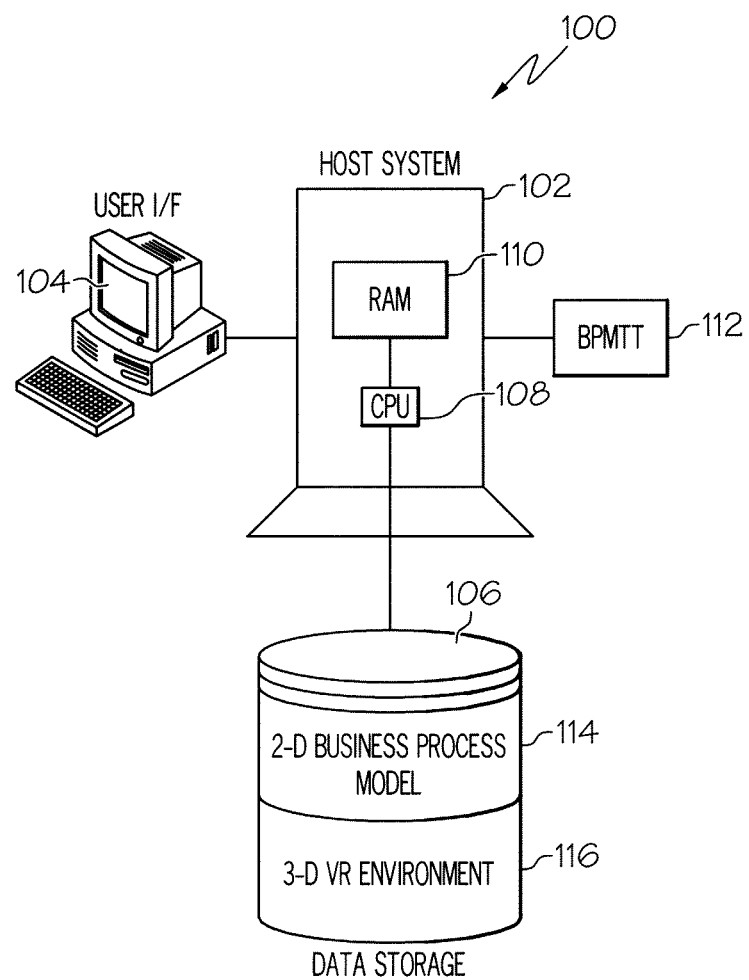
FIG. 1 depicts an example of a computer system for generating a 3-D VR environment from a business process model.

The detailed description explains the preferred embodiments of the invention, together with advantages and features, by way of example with reference to the drawings.

DETAILED DESCRIPTION OF THE INVENTION

Exemplary embodiments, as shown and described by the various figures and the accompanying text, provide a method and computer program product for generating a three-dimensional (3-D) virtual reality (VR) environment from a business process model. VR technology can be used to validate, simulate, execute, and monitor a business process. A variety of VR environments may be generated from a business process model. In these VR environments an activity can be represented by a virtual room, and transitions between activities can be represented by virtual corridors, virtual doors, or virtual windows connecting the virtual rooms. A transformation algorithm can be used to generate the 3-D VR environment from a graph representing the business process model. The graph can be a BPMN graph, an UML activity diagram, or any other business process model graph. The graph can include multiple nodes connected by one or more arcs. In the case that nodes represent activities, then those nodes are represented as virtual rooms, and the arcs connecting the nodes are represented as virtual corridors, virtual doors, or virtual windows connecting the virtual rooms. In the case in which arcs represent activities, then the arcs become virtual rooms and the nodes become the virtual corridors, virtual doors, or virtual windows connecting the rooms. In exemplary embodiments, the virtual corridors provide a virtual pathway to connect virtual rooms, while the virtual doors serve as virtual access barriers in response to satisfying one or more transition criterion to enter or exit a virtual room. The virtual windows can also serve as virtual access barriers in response to satisfying one or more transition criterion to enter or exit a virtual room via the virtual windows.

A mapping algorithm can be used to transform a 2-D business process model to a 3-D VR environment. Activities become virtual rooms, independent of their representation as nodes or arcs. Transitions become virtual access points to the virtual rooms, independent of their representation as arcs or nodes. Virtual access points can be embodied as virtual corridors, virtual doors, or virtual windows connecting the virtual rooms, while maintaining the activity and transition criteria constraints of the 2-D business process model. Thus, the 3-D VR environment establishes virtual physical constraints on movement in a virtual world from the physically unbounded 2-D business process model.

A user can annotate the 2-D business process model to describe some of the VR characteristics of the activities and transitions. For example, the user may designate a particular transition to generate a virtual corridor, and some other transition to be a virtual door. In addition, the way a process starts or finish may be designated using other VR objects. For example, a trash bin can be used to represent rejecting an application (e.g., in a loan approval process).

Executing a business process as used herein is a generic term that has two meanings. It can refer to a particular instantiation of a business process, for example, in a loan approval process, referring to loan application number 132785. However, it can also refer to all the executing instances of the business process, for example, all loan applications. The present invention is applicable to both meanings. In the VR environment a process instance may be represented by an object. The object can be a piece of paper, a person, or any other suitable object to represent a single process instance. Further details regarding generation of a 3-D VR environment from a business process model are provided herein.

Turning now to the drawings, it will be seen that in FIG. 1 there is a block diagram of a system 100 for generating a 3-D VR environment from a business process model that is implemented in accordance with exemplary embodiments. The system 100 of FIG. 1 includes a host system 102 in communication with a user interface 104 and a data storage device 106. The host system 102 may be any type of computer system known in the art. For example, the host system 102 can be a desktop computer, a laptop computer, a general-purpose computer, a mainframe computer, or an embedded computer (e.g., a computer within a wireless device). In exemplary embodiments, the host system 102 executes computer readable program code. While only a single host system 102 is shown in FIG. 1, it will be understood that multiple host systems can be implemented, each in communication with one another via direct coupling or via one or more networks. For example, multiple host systems 102 may be interconnected through a distributed network architecture. The single host system 102 may also represent a server in a client-server architecture.

In exemplary embodiments, the host system 102 includes at least one processing circuit (e.g., CPU 108) and volatile memory (e.g., RAM 110). The CPU 108 may be any processing circuit technology known in the art, including for example, a microprocessor, a microcontroller, an application specific integrated circuit (ASIC), a programmable logic device (PLD), a digital signal processor (DSP), or a multi-core/chip module (MCM). The RAM 110 represents any volatile memory or register technology that does not retain its contents through a power/depower cycle, which can be used for holding dynamically loaded application programs and data structures. The RAM 110 may comprise multiple memory banks partitioned for different purposes, such as data cache, program instruction cache, and temporary storage for various data structures and executable instructions. It will be understood that the host system 102 also includes other computer system resources known in the art, and not depicted, such as one of more power supplies, clocks, interfacing circuitry, communication links, and peripheral components or subsystems.

The user interface 104 includes a combination of input and output devices for interfacing with the host system 102. For example, user interface 104 inputs can include a keyboard, a keypad, a touch sensitive screen for inputting alphanumerical information, a VR glove, a motion-sensing device, a camera, a microphone, or any other device capable of producing input to the host system 102. Similarly, the user interface 104 outputs can include a monitor, a terminal, a liquid crystal display (LCD), stereoscopic technology, speakers, headphones, or any other device capable of outputting visual and/or audio information from the host system 102.

The data storage device 106 refers to any type of storage and may comprise a secondary storage element, e.g., hard disk drive, tape, or a storage subsystem that is internal or external to the host system 102. In alternate exemplary embodiments, the data storage device 106 includes one or more solid-state devices, such as ROM, PROM, EPROM, EEPROM, flash memory, NOVRAM or any other electric, magnetic, optical or combination memory device capable of storing data (i.e., a storage medium), some of which represent executable instructions for the CPU 108. It will be understood that the data storage device 106 shown in FIG. 1 is provided for purposes of simplification and ease of explanation and is not to be construed as limiting in scope. To the contrary, there may be multiple data storage devices 106 utilized by the host system 102.

In exemplary embodiments, the host system 102 executes a business process model transformation tool (BPMTT) 112. The host system 102 may also execute other applications, operating systems, and the like. The BPMTT 112 accesses the data storage device 106 to analyze a 2-D business process model 114. The 2-D business process model 114 may include multiple nodes interconnected by arcs to model a business process that is unbounded to a physical implementation. The BPMTT 112 analyzes activities and transitions in the 2-D business process model 114 and transforms each activity and transition into virtual physical structures in a 3-D VR environment 116. The 3-D VR environment 116 is stored on the data storage device 106, and can be output to the user interface 104. In alternate exemplary embodiments, the 3-D VR environment 116 is not stored on the data storage device 106, but directly executed on the host system 102.

Figure 2:
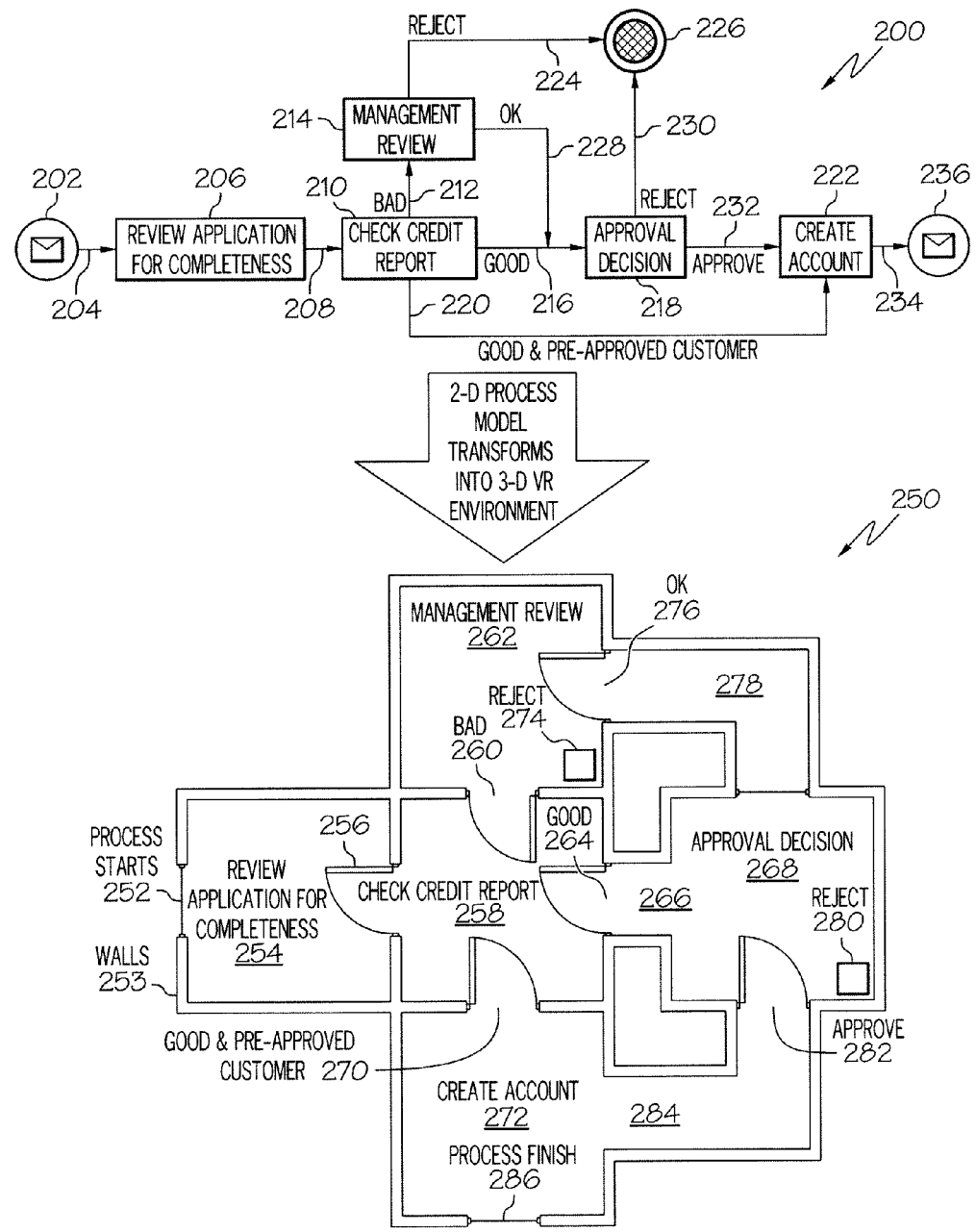
FIG. 2 depicts an example of a 2-D business process model transformed into a 3-D VR environment.

A graphical example of generating a 3-D VR environment from a 2-D business process model is depicted in FIG. 2. Graphical 2-D business process model 200 represents a process for loan application processing, which is not limited to a particular physical implementation. The graphical 2-D business process model 200 includes a process start node 202, e.g., an e-mail request initiating the process. An arc 204 transitions unconditionally to a review application for completeness node 206. Upon completion of the activity in the review application for completeness node 206, an arc 208 transitions unconditionally to a check credit report node 210. The activity in the check credit report node 210 can result in multiple outcomes. If the credit report is bad, a bad credit arc 212 transitions to a management review node 214. If the credit report is good, a good credit arc 216 may transition to an approval decision node 218. Alternatively, the check credit report node 210 can transition via a good and pre-approved customer arc 220 to a create account node 222, bypassing the approval decision node 218. Returning to the management review node 214, a rejection arc 224 transitions to a termination node 226. If the management review is successful in the management review node 214, an OK arc 228 transitions to the approval decision node 218. At the approval decision node 218, a rejection arc 230 transitions to the termination node 226. Conversely, if the approval occurs, then the approval decision node 218 transitions via an approve arc 232 to the create account node 222. The create account node 222 transitions unconditionally via arc 234 to a process finish node 236, which may generate a confirmation e-mail.

In an exemplary embodiment, the graphical 2-D business process model 200 represents a graphical version of the 2-D business process model 114 of FIG. 1 upon which the BPMTT 112 may perform a transformation to the 3-D VR environment 116. A top view of a resulting graphical 3-D VR environment 250 is depicted in FIG. 2, as generated from the graphical 2-D business process model 200 using the BPMTT 112 of FIG. 1. In an exemplary embodiment, the BPMTT 112 converts each node and arc element in the graphical 2-D business process model 200 into virtual rooms and virtual access points to the virtual rooms in the graphical 3-D VR environment 250. For example, the process start node 202 and arc 204 transitioning unconditionally to the review application for completeness node 206 are condensed into a virtual start process door 252 to enter a review application for completeness virtual room 254. A user maneuvering through the graphical 3-D VR environment 250 is constrained by virtual walls 253, acting as virtual physical constraints, and must therefore satisfy any transition criteria to advance through a virtual access point into or out of a virtual room.

Once activity in the review application for completeness virtual room 254 is complete, the user can advance through a virtual door 256 to a check credit report virtual room 258, which maps to the arc 208 transitioning unconditionally to the check credit report node 210. Similarly, the bad credit arc 212 transitioning to the management review node 214 maps to a bad credit virtual door 260 providing access to a management review virtual room 262. The good credit arc 216 transitioning to the approval decision node 218 maps to a good credit virtual door 264 connecting via a virtual corridor 266 to an approval decision virtual room 268. The virtual corridor 266 may be used as a buffer area to increase separation between virtual rooms and support complex pathways as additional virtual rooms are added. The good and pre-approved customer arc 220 transitioning to the create account node 222 maps to a good and pre-approved customer virtual door 270 for accessing a create account virtual room 272.

Returning to the management review virtual room 262, rejection arc 224 transitioning to the termination node 226 can be represented as a virtual reject bin 274. The OK arc 228 transitioning to the approval decision node 218 maps to an OK virtual door 276 connecting via a virtual corridor 278 to the approval decision virtual room 268. The rejection arc 230 transitioning to the termination node 226 maps to a virtual reject bin 280 in the approval decision virtual room 268. Upon approval, the approve arc 232 transitioning to the create account node 222 maps to an approve virtual door 282 connecting via a virtual corridor 284 to the create account virtual room 272. The create account node 222 transitioning unconditionally via the arc 234 to the process finish node 236 maps to a process finish virtual door 286 to exit the create account virtual room 272. Although no virtual windows are depicted in the graphical 3-D VR environment 250, virtual windows can be added or the BPMTT 112 configured to convert one or more of the virtual access points to a virtual window.

A generated 3-D VR environment, such as the 3-D VR environment 116 of FIG. 1, can be used in several ways, such as business process validation, simulation, execution, and monitoring. In business process validation, a user can navigate (walk, fly, etc.) the 3-D VR environment visiting the different activities (virtual rooms) and looking at VR representations of the type of work that must be done at that activity. By navigating the 3-D VR environment, the user may discover how easy or hard it will be to execute the business process. The user can apply this knowledge to redesign the business process model.

In business process simulation, the user can see a simulation of the business process executing by having virtual humans or machines in each virtual room simulating the work needs to be completed in that activity. The user observing the simulation can observe the simulation from a distance or navigate the generated 3-D VR environment while the simulation is executing to see how the business process will be performed. The user can apply this knowledge to redesign the business process model.

Although a business process does not need to be executed in a 3-D VR environment to take advantage of the present invention, users may enter the 3-D VR environment to execute the business process, or assign a particular virtual room to perform work for an activity of the business process. There are several VR interaction and collaboration technologies known in the art that can be used to complete the work for an activity in a virtual room. Some virtual rooms may include more than one user participating in the activity. Any VR work and collaboration techniques known in the art can be used to allow users to do their work for the specific activity in each virtual room.

While a business process is being executed (in a 3-D VR environment or otherwise) a VR environment representing the business process can be updated to show the current state of the business process. This allows a user to observe in real time or near real time the progress of the business process. This is similar to simulating a business process in a VR environment; however, the presented data comes from real activities instead of simulated activities.

Any VR technique used to represent data, manipulate data, and interact with a 3-D VR environment known in the art can be used in conjunction with the present invention. In the cases in which the business process does not contain any human activities, and so, no human collaboration is required in the 3-D VR environment, business process validation, simulation, and monitoring may still be performed.

Figure 3:
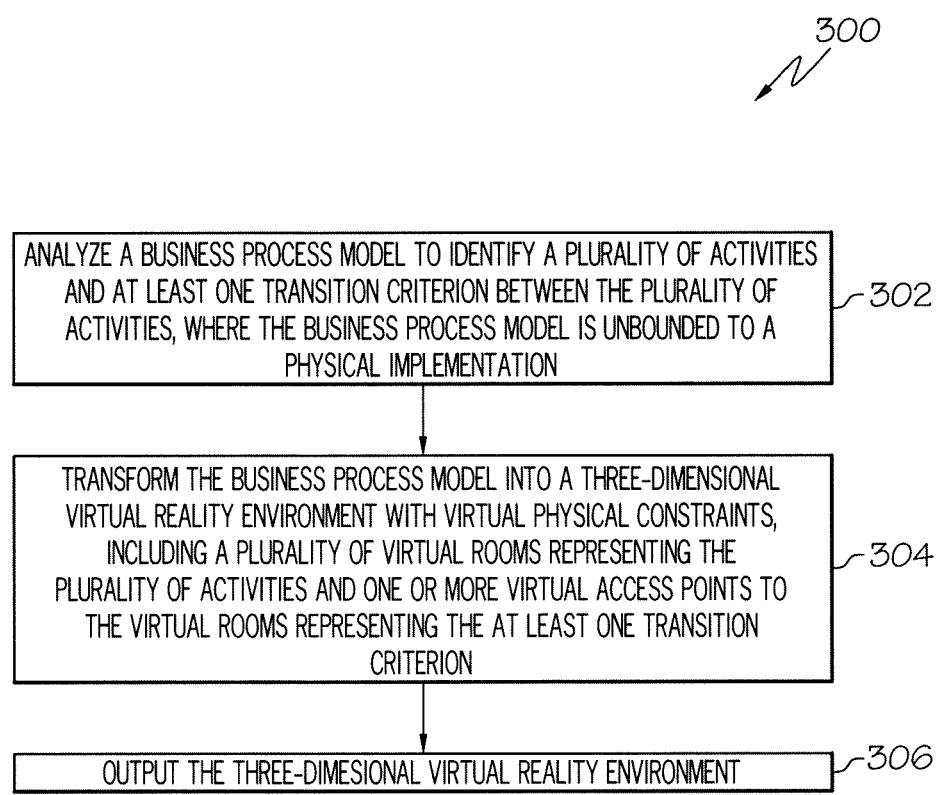
FIG. 3 depicts a process for generating a 3-D VR environment from a business process model in accordance with exemplary embodiments.

Turning now to FIG. 3, a process 300 for generating a 3-D VR environment from a business process model will now be described in accordance with exemplary embodiments, and in reference to the system 100 of FIG. 1. A user can initiate the BPMTT 112 to perform the process 300 on the host system 102 via the user interface 104 of FIG. 1. At block 302, the BPMTT 112 analyzes the 2-D business process model 114 to identify multiple activities and at least one transition criterion between the activities, where the 2-D business process model 114 is unbounded to a physical implementation. The 2-D business process model 114 can be constructed of graphical elements, such as nodes and arcs, as depicted in the graphical 2-D business process model 200 of FIG. 2. The activities in the 2-D business process model 114 may be represented as nodes, while the one or more transition criteria are represented as arcs, or vice versa.

At block 304, the BPMTT 112 transforms the 2-D business process model 114 into the 3-D VR environment 116 with virtual physical constraints, including multiple virtual rooms to representing the activities and one or more virtual access points to the virtual rooms representing the transition criteria. The virtual access points can include one or more virtual corridors, virtual doors, or virtual windows. For example, the transformation can be as depicted graphically in FIG. 2 to generate the graphical 3-D VR environment 250, of which a top view is depicted.

At block 306, the BPMTT 112 outputs the 3-D VR environment 116. The output may be to the data storage device 106 and/or to the user interface 104, enabling a user to interact with the 3-D VR environment 116.

The transformation of a business process model into one or more 3-D VR environments by using virtual rooms for activities in which one or more users may interact to accomplish a task, and virtual corridors, virtual doors, or virtual windows for transitions connecting the activities can make it is easier for a user to understand, validate, simulate, execute, and monitor the business process. In addition, it is easier for the user to describe the business process to other users by navigating (e.g., walking or flying) through the 3-D VR environment. While other conversion tools may convert a 2-D physical model by simply adding a third dimension (e.g., a production line in a factory building), the present invention generates a 3-D VR environment from a 2-D business process model that is not physically constrained to a particular location (e.g., new account creation). Thus, a more concrete and tangible appearance is given to a business process that is otherwise unconstrained by physical boundaries.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method comprising:
   receiving a business process model including one or more nodes and one or more arcs to represent one or more activities and at least one transition criterion for the one or more activities within a business process;
   analyzing the nodes and arcs of the business process model via a processor and mapping the one or more activities to one or more virtual rooms and the at least one transition criterion to one or more virtual access points of the one or more virtual rooms; and
   generating, via a processor, a navigable virtual reality environment corresponding to the business process of the business process model, wherein the virtual reality environment includes the one or more virtual rooms representing the one or more activities and the one or more virtual access points to the one or more virtual rooms representing the at least one transition criterion.

2. The computer-implemented method of claim 1, wherein the one or more virtual access points include one or more of: a virtual corridor, a virtual door, and a virtual window.

3. The computer-implemented method of claim 2, wherein the virtual corridor provides a virtual pathway to connect two or more of the virtual rooms, and the virtual door and the virtual window each provide a virtual access barrier for traversing one or more of the virtual rooms in response to the at least one transition criterion.

4. The computer-implemented method of claim 1, wherein the one or more nodes and one or more arcs represent a two-dimensional business process model, and the virtual reality environment includes a three-dimensional virtual reality environment.

5. The computer-implemented method of claim 1, wherein the business process includes loan application processing.

6. The computer-implemented method of claim 5, wherein the one or more virtual rooms representing the one or more activities correspond to at least one of a review application for completeness activity, a check credit report activity, a management review activity, and an approval decision activity.

7. The computer-implemented method of claim 1, wherein the virtual reality environment is configured to validate the business process, to simulate the business process, to execute the business process, and to monitor the business process.

8. A system comprising:
   a computer system including at least one processor configured to:
   receive a business process model including one or more nodes and one or more arcs to represent one or more activities and at least one transition criterion for the one or more activities within a business process;
   analyze the nodes and arcs of the business process model and map the one or more activities to one or more virtual rooms and the at least one transition criterion to one or more virtual access points of the one or more virtual rooms; and generate a navigable virtual reality environment corresponding to the business process of the business process model, wherein the virtual reality environment includes the one or more virtual rooms representing the one or more activities and the one or more virtual access points to the one or more virtual rooms representing the at least one transition criterion.

9. The system of claim 8, wherein the one or more virtual access points include one or more of: a virtual corridor, a virtual door, and a virtual window.

10. The system of claim 9, wherein the virtual corridor provides a virtual pathway to connect two or more of the virtual rooms, and the virtual door and the virtual window each provide a virtual access barrier for traversing one or more of the virtual rooms in response to the at least one transition criterion.

11. The system of claim 8, wherein the one or more nodes and one or more arcs represent a two-dimensional business process model, and the virtual reality environment includes a three-dimensional virtual reality environment.

12. The system of claim 8, wherein the business process includes loan application processing.

13. The system of claim 12, wherein the one or more virtual rooms representing the one or more activities correspond to at least one of a review application for completeness activity, a check credit report activity, a management review activity, and an approval decision activity.

14. The system of claim 8, wherein the virtual reality environment is configured to validate the business process, to simulate the business process, to execute the business process, and to monitor the business process.

15. A computer program product comprising:
a computer useable medium having computer readable program code embodied therewith, the computer readable program code comprising computer readable program code configured to:
receive a business process model including one or more nodes and one or more arcs to represent one or more activities and at least one transition criterion for the one or more activities within a business process;

analyze the nodes and arcs of the business process model and map the one or more activities to one or more virtual rooms and the at least one transition criterion to one or more virtual access points of the one or more virtual rooms; and generate a navigable virtual reality environment corresponding to the business process of the business process model, wherein the virtual reality environment includes the one or more virtual rooms representing the one or more activities and the one or more virtual access points to the one or more virtual rooms representing the at least one transition criterion.

16. The computer program product of claim 15, wherein the one or more virtual access points include one or more of: a virtual corridor, a virtual door, and a virtual window.

17. The computer program product of claim 16, wherein the virtual corridor provides a virtual pathway to connect two or more of the virtual rooms, and the virtual door and the virtual window each provide a virtual access barrier for traversing one or more of the virtual rooms in response to the at least one transition criterion.

18. The computer program product of claim 15, wherein the one or more nodes and one or more arcs represent a two-dimensional business process model, and the virtual reality environment includes a three-dimensional virtual reality environment.

19. The computer program product of claim 15, wherein the business process includes loan application processing.

20. The computer program product of claim 19, wherein the one or more virtual rooms representing the one or more activities correspond to at least one of a review application for completeness activity, a check credit report activity, a management review activity, and an approval decision activity.

21. The computer program product of claim 15, wherein the virtual reality environment is configured to validate the business process, to simulate the business process, to execute the business process, and to monitor the business process.

* * * * *